(No Model.)
G. C. KACHEL & H. SAGER.
BUNG AND FAUCET.
No. 592,295. Patented Oct. 26, 1897.
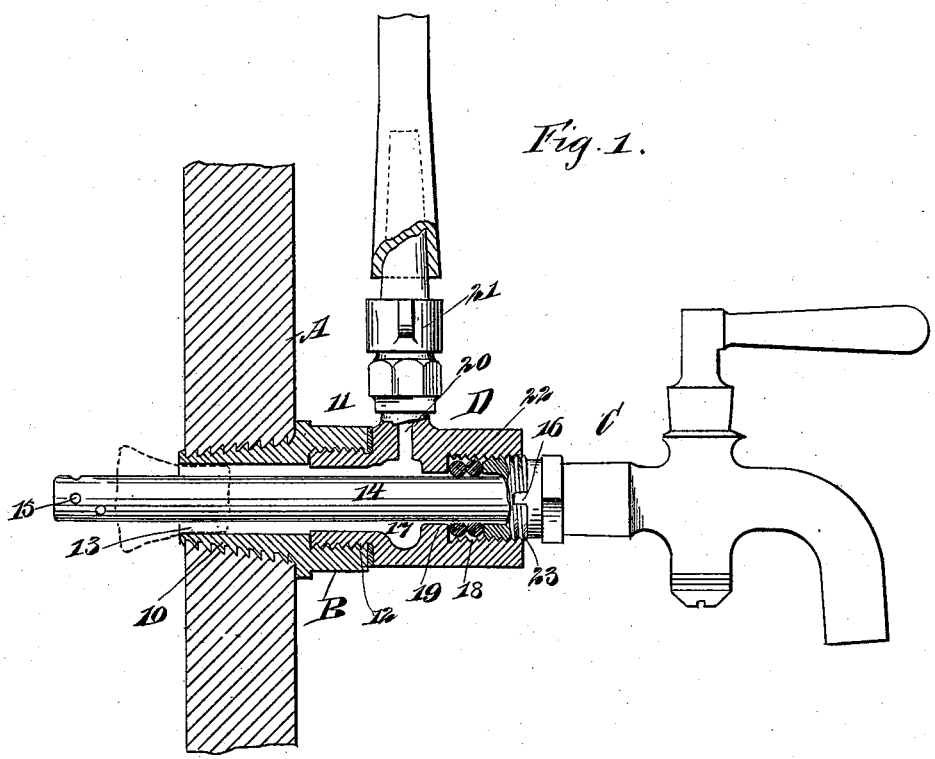
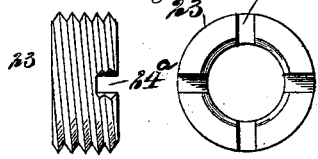 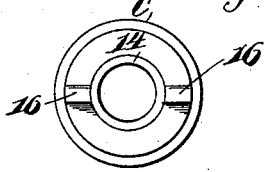 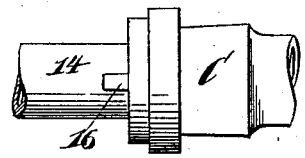
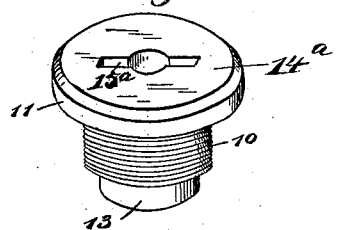
WITNESSES:
INVENTORS
G. C. Kachel.
H. Sager.
BY
ATTORNEYS.

UNITED STATES PATENT OFFICE.

GEORGE C. KACHEL AND HENRY SAGER, OF GIRARDVILLE, PENNSYLVANIA.

BUNG AND FAUCET.

SPECIFICATION forming part of Letters Patent No. 592,295, dated October 26, 1897.

Application filed September 2, 1896. Serial No. 604,659. (No model.)

*To all whom it may concern:*

Be it known that we, GEORGE C. KACHEL and HENRY SAGER, of Girardville, in the county of Schuylkill and State of Pennsylvania, have invented a new and useful Improvement in Bungs and Faucets, of which the following is a full, clear, and exact description.

The object of our invention is to provide bungs adapted for use in tapping beer-kegs and casks containing ale and other liquid without the necessity of using a mallet and without destroying the keg or cask, as frequently occurs under the old process, the faucet employed being particularly adapted for this purpose.

A further object of the invention is to provide a bushing and barrel to receive the faucet so constructed that the kegs or casks will be practically as clean when returned to the brewery as when taken therefrom, since all the liquid may be drained from the receptacle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional view through a portion of the head of the keg and through the barrel and bushing placed at that point, illustrating a faucet in position in the said barrel and bushing, the said faucet being partly in side elevation and partly in section. Fig. 2 represents, respectively, a side and an end elevation of a sleeve used in connection with the faucet. Fig. 3 is a rear view of the faucet. Fig. 4 is a side elevation of that portion of the faucet where it connects with the sleeve; and Fig. 5 is a perspective view of a bushing which is adapted to be introduced into the receptacle, illustrating the application of a closing top.

A bushing B is illustrated as introduced into the head A of a keg. This bushing comprises an exteriorly-threaded and exteriorly-tapering shank 10 and a head or flanged portion 11, the bore of the head or flanged portion being of greater diameter than that of the shank, and the interior portion of the bore at the head or flanged portion is provided with a thread 12. A stopper 13, of cork or other desired material, is temporarily placed within the keg and normally closes the inner end of the said bushing, as illustrated in Fig. 1.

When the keg, cask, or receptacle is sent from the brewery, the stopper 13, as stated, closes the inner end of the bushing B, while a metal cap or stopper $14^a$ (shown in Fig. 5) is employed to close the outer end of the said bushing, being screwed therein, and this metal stopper is provided with a slot or slots $15^a$, adapted to receive a wrench, so that the outer or metallic stopper may be readily removed when a faucet is to be introduced.

The faucet C (shown) is one that is particularly adapted for use in connection with the bushing of the receptacle and its attachment; but any necessary coupling may be employed instead. The faucet C is provided with a longitudinal stem 14, closed at its extreme inner end, but adjacent to said inner end orifices 15 may be made, through which the liquid flows from the keg or receptacle into the stem of the faucet, and from said stem into the body portion of the faucet to be controlled by the key of the same. Where the stem connects with the body portion of the faucet, side lugs 16 are formed at the shoulder, produced by the intersection of these parts. A barrel D is usually employed in connection with the faucet and the bushing B, and the inner end of this barrel is reduced and exteriorly threaded in order that it may be screwed into the head or flanged portion of the said bushing B. The interior of the barrel is divided into two chambers—a rear chamber 17 and a front chamber 18—by means of a partition 19, in which an opening is made of slightly greater diameter than the diameter of the faucet-stem. A channel 20 is carried from the inner chamber 17 out to the top of the said barrel and connects with a valve-controlled pipe 21, which pipe is adapted to be connected with a source of air-supply under pressure, or with any fluid under pressure used to force the liquid to given heights. This pressure attachment may be of any ordinary construction. An exteriorly-threaded sleeve 23 is screwed into the outer end of the barrel-chamber 18, and this sleeve is provided, preferably, with slots 24ᵃ in its outer face, in order that it may be turned by means of a wrench. Back of the sleeve 23, between said sleeve and the partition 19, one or more washers 22 of an elastic material are located, being usually made of rubber.

In operation the barrel D is screwed into the head-bushing, and next the stem 14 of the faucet is passed through the barrel and into the bushing, the sleeve 23 having been first placed upon the stem and its slots receiving the offsets or lugs 16 of the faucet. As the sleeve 23 is screwed into the barrel D the inner end of the faucet-stem will force the cork 13, employed to temporarily close the inner end of the bushing, out from the stem into the cask or receptacle, permitting the flow of liquid into the faucet, and the faucet is prevented from being removed by screwing the sleeve 23 in until it so compresses the elastic washers as to hold them in close frictional engagement with the wall of the barrel-chamber 18 and the stem of the faucet, also preventing any leakage at this point.

Having thus described our invention, we claim as new and desire to secure by Letters Patent—

1. The combination, with a bushing, comprising an interiorly-threaded head and an exteriorly-threaded shank, of a barrel adapted to screw into the head portion of the bushing, a sleeve screwing into the outer end of the said barrel, and a faucet provided with a stem extending through the sleeve, barrel and bushing, the said sleeve and faucet being provided with means whereby they may be locked to turn together, as and for the purpose specified.

2. The combination, with a bushing provided with a head and a threaded shank, of a barrel adapted to be secured to the head portion of the bushing, a sleeve adapted to enter the outer end of the said barrel, a faucet provided with a stem extending through the sleeve, barrel and bushing, an elastic washer held between the inner end of the sleeve and a support in the said barrel and adapted when compressed by screwing in the said sleeve to form a close frictional engagement with the wall of the barrel and the stem of the faucet, the said faucet and sleeve having a locking engagement with each other, as and for the purpose specified.

3. The combination, with a bushing comprising an interiorly-threaded head and an exteriorly-threaded shank, of a barrel adapted to screw into the head portion of the bushing a sleeve screwing into the outer end of the said barrel, and a faucet provided with a stem extending through the sleeve, barrel and bushing, the said faucet being provided with lugs adapted to engage slots in the outer end of the said sleeve, whereby the said faucet controls the movement of said sleeve, as and for the purpose specified.

4. A faucet provided with a stem adapted to enter a receptacle, a coupling through which said stem extends, a sleeve adapted to screw into the said coupling, a locking engagement between the said faucet and the said sleeve, and a valve-controlled pipe connected by a channel with the interior of said coupling, as and for the purpose specified.

5. A faucet provided with a stem adapted to enter a receptacle, lugs located on the exterior of the said stem, and a sleeve adapted to enter a coupling, having openings to receive the lugs on the faucet, as and for the purpose specified.

6. A faucet provided with a stem adapted to enter a receptacle, lugs located on the exterior of the said stem, a sleeve adapted to enter a coupling, having openings to receive the lugs on the faucet, and a cushion-washer against which the sleeve has bearing, the sleeve being adapted to bear against a support in the coupling into which the faucet is introduced, as and for the purpose specified.

GEORGE C. KACHEL.
HENRY SAGER.

Witnesses:
W. G. PARKER,
LOUIS BILTZ.